July 22, 1941.  D. L. HOFER  2,250,021
RELIEF VALVE CONTROL
Filed Feb. 25, 1938  2 Sheets-Sheet 1

INVENTOR
D. L. Hofer
BY
ATTORNEY

July 22, 1941.    D. L. HOFER    2,250,021
RELIEF VALVE CONTROL
Filed Feb. 25, 1938    2 Sheets-Sheet 2

INVENTOR
*D. L. Hofer*
BY
ATTORNEY

Patented July 22, 1941

2,250,021

UNITED STATES PATENT OFFICE 2,250,021

RELIEF VALVE CONTROL

David L. Hofer, Albany, Calif.

Application February 25, 1938, Serial No. 192,576

4 Claims. (Cl. 137—139)

This invention relates in general to an automatic control for suction pipe relief valves, and in particular the invention pertains to an automatic control for that type of relief valve used on the suction pipe of a suction dredge to relieve excessive vacuum which the pumps may create in the pipe when a stoppage occurs at the outer end of the pipe preventing free flow of water and mud therethrough. The present invention represents an improvement over the device shown in United States Letters Patent #2,096,595, issued to J. C. Sanford on October 19, 1937.

It has been determined that where the relief valve control mechanism is actuated directly by the excess vacuum, as in the above identified U. S. patent, the mechanism tends to cause the valve to "teeter" or "jockey" as the vacuum rises and falls. Such occurrence often caused damage to the equipment and particularly the pump.

It is therefore the principal object of the present invention to provide an automatic combination electric and fluid pressure control assembly for the vacuum relief valve on the suction pipe of a suction dredge; such control being arranged to positively and instantaneously open the relief valve when necessary and to maintain the valve in open position until the vacuum has been relieved to the desired extent and without such teetering or jockeying.

Another object of my invention is to provide a novel device, including a vacuum gauge, photoelectric cell and a source of light in combination, to place the automatic relief valve control assembly in operation.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
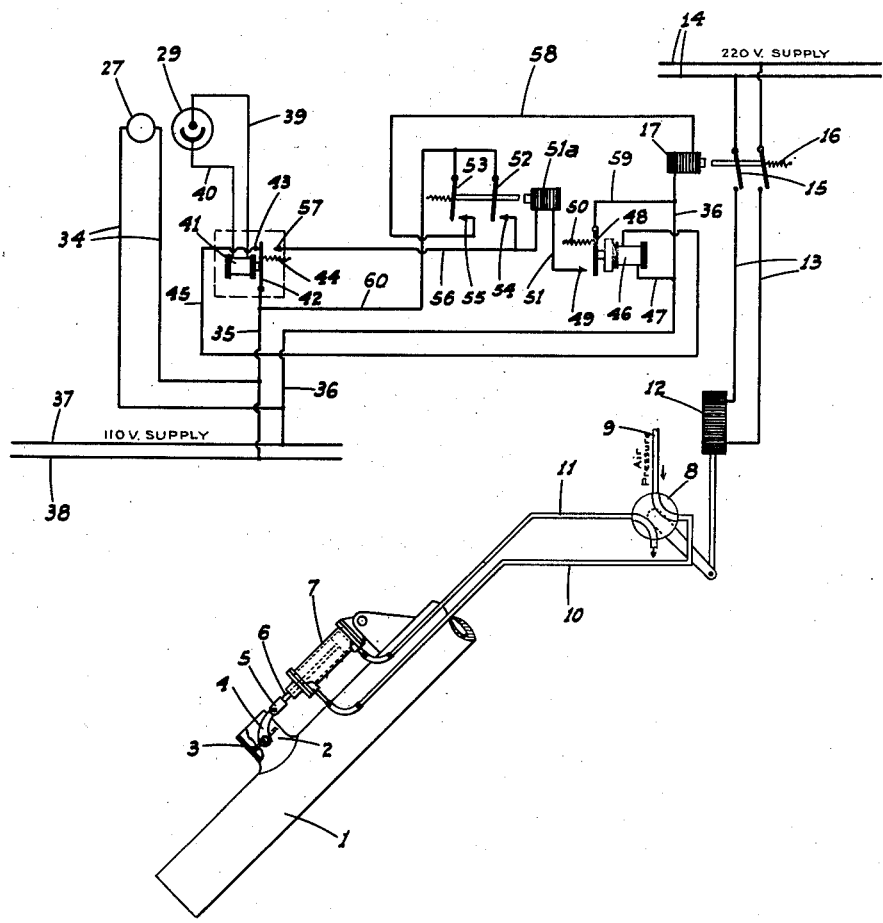
Figure 1 is a diagrammatic view of the assembly, including the circuit in a normal position or with the relief valve on the suction pipe closed.
Figure 2:
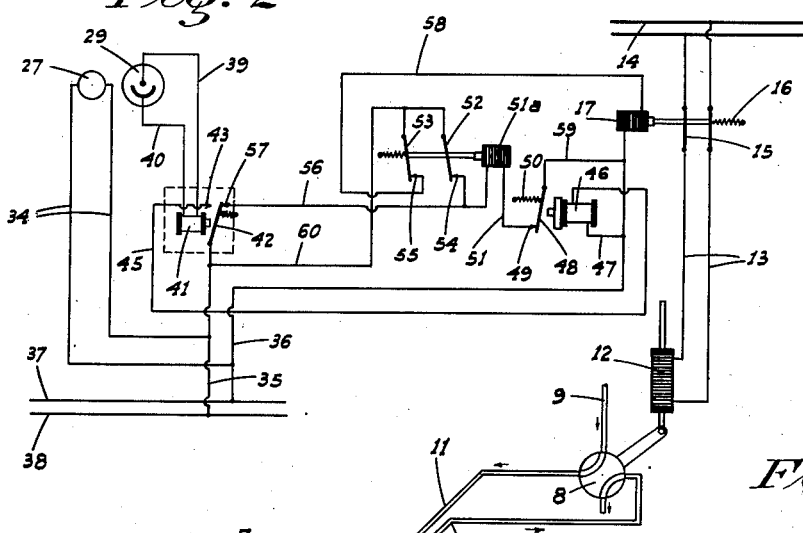
Figure 2 is a similar view but showing the position of the various parts when the valve is open.
Figure 3:
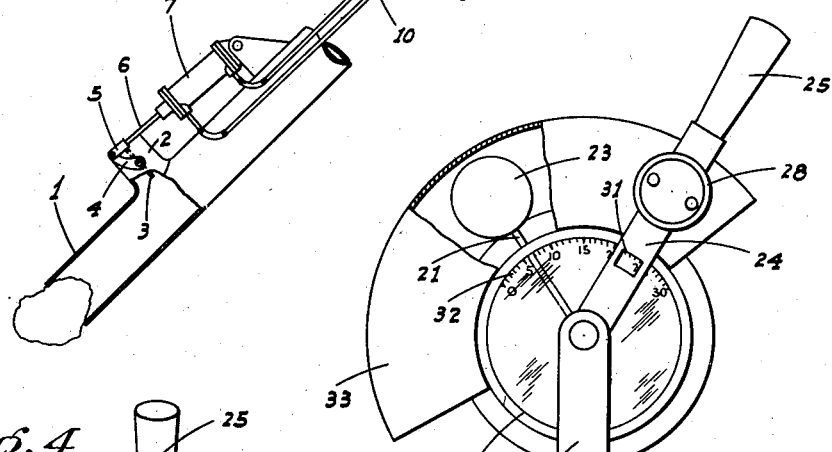
Figure 3 is a front elevation of the device which places the assembly in operation, the hood being partially broken away.
Figure 4:
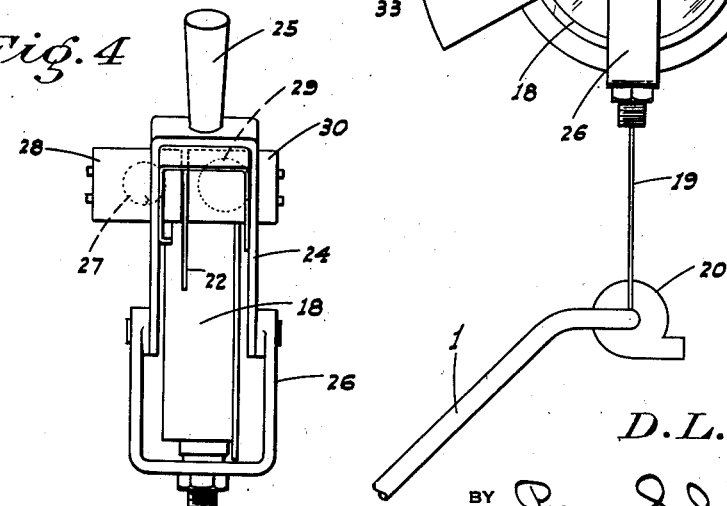
Figure 4 is an end elevation of such device.

Referring now more particularly to the characters of reference on the drawings, the numeral 1 indicates the suction pipe of a suction dredge. A tubular passage member 2 is mounted on the pipe 1 adjacent its lower end and a circular butterfly plate 3 is pivoted within the member 2; said member 2 and plate 3 forming the relief valve. A radial lever 4 is fixed in the pivot shaft of plate 3 exteriorly of member 2, and the outer end of this lever is pivotally connected by a clevis 5 with the outer end of the piston rod 6 of a fluid actuated power cylinder 7 suitably pivoted on the suction pipe adjacent member 2.

A common four-way valve 8 is disposed on the dredger in a suitable place and air under pressure is supplied to the valve from a pipe 9. The valve is connected to the power cylinder by pipes 10 and 11, and by proper manipulation of the valve, the piston in the power cylinder can be actuated in either direction so as to open or close the relief valve. The valve 8 is solenoid controlled, as is commonly done, the numeral 12 indicating the actuating solenoid which is connected by wires 13 with 220 volt supply lines 14. When solenoid 12 is deenergized, the power cylinder is in position with the relief valve closed.

A magnet actuated, double pole switch 15 is interposed in wires 13; this switch 15 normally being held open by spring 16 and closed through the medium of the magnet 17. The energizing of magnet 17 thus controls the actuation of four-way valve 8 and resultant operation of the power cylinder. The four-way valve is arranged relative to pipes 9, 10 and 11 so that when the solenoid is deenergized, a flow of air passes from pipe 9 through pipe 10, acting on the piston in cylinder 7 to hold valve 3 in closed position. When the solenoid is energized, the valve plug is rotated to place pipes 9 and 11 in communication, to reverse the position of the piston and move the valve 3 to an open position. Such energizing of magnet 17 is effectuated at the proper time through the medium of the assembly and circuit hereinafter described in detail.

A vacuum gauge 18 is mounted on the dredge with a pipe 19 connecting the gauge with the dredge suction pipe 1 between the pump 20 and relief valve. The needle 21 of the gauge projects through a slot 22 in the gauge casing and carries a black disc 23 on its outer end and exteriorly of the gauge body. A swinging yoke 24, having a projecting handle 25, is pivoted on a suitable mount 26 concentric with the axis of needle 21. One arm of the yoke carries an incandescent lamp 27 in a housing 28, while the other arm carries a photoelectric cell 29 in another housing 30, the housings 28 and 30 and the disc 23 being disposed equidistant from the needle axis, said housings being spaced apart at adjacent ends only sufficient for the passage of disc 23. A sight opening 31 permits setting of the yoke 24 at any desired position relative to the scale 32 on the gauge. A semi-circular hood 33 on the yoke covers the disc 23 and protects the same.

The incandescent lamp 27 is illuminated at all times, current being supplied through wires 34 connected to wires 35 and 36 which lead from 110 volt wires 37 and 38. The photoelectric cell 29 is operatively connected by suitable means including leads 39 and 40 to a D. C. current relay 41, preferably a Weston Electrical Instrument Co. relay model 534, having 0.075 range in milliamperes.

Wire 35 also connects with the armature or switch blade 42 of the relay 41 which is normally energized holding the blade in contact with one switch point 43 and against the tension of a spring 44.

A wire 45 extends from switch point 43 to connection with one lead of the coil of a time delay relay 46, the other lead being connected by wire 47 to wire 36. Thus, when armature 42 of relay 41 is in engagement with switch point 43, a circuit is completed through time delay relay 46 energizing the coil thereof and holding the armature or switch blade 48 out of engagement with switch point 49 and against the tension of spring 50. The contact point 49 of the time delay relay is connected by wire 51 to one lead of the magnet 51a of a normally open, double pole magnetic switch comprising switch blades 52 and 53 and switch points 54 and 55.

The other lead of magnet 51a extends as wire 56 to contact point 57 of the relay 41; contact point 54 of the double pole switch actuated by magnet 51a being connected to said wire 56, while the other contact point 55 of the switch connects by wire 58 to one side of magnet 17. A common wire 60 extends from switch blades 52 and 53 to wire 35. Wire 36 extends to and connects with the other side of magnet 17, and a wire 59 connects wire 36 and the armature 48 of time delay relay 46.

Operation

In use my automatic control assembly for suction pipe relief valves functions in the following manner.

The swinging yoke 24 of the control unit is positioned with sight opening 31 over the numeral of scale 32 indicating the inches of vacuum at which it is desired that the relief valve on the suction pipe be opened. The relay 41 and time delay relay 46 are thus normally energized, as heretofore described, holding the relief valve control portion of the circuit open as shown in Fig. 1 of the drawings.

However, in the event of a stoppage or "slugging" at the outer end of the dredge suction pipe, the needle 21 of the vacuum gauge will swing in a direction relative to the scale 32 to indicate the increasing vacuum in the pipe and when the disc 23 passes between the lamp 27 and the photoelectric cell 29, the latter is deenergized with the following result:

Armature 42 of relay 41 swings away from contact point 43 and engages contact point 57, and thereafter armature 48 of time delay relay 46 shifts to engagement with contact point 49 due to the influence of spring 50. When this occurs, magnet 51a is energized as it is then disposed in a completed circuit leading from the 110 volt supply lines 37 and 38. Upon magnet 51a being energized, switch blades 52 and 53 are swung into engagement with contact points 54 and 55 respectively. A circuit is then established between wire 56 and wire 58 completing the circuit from 110 volt supply wire 37 to one side of magnet 17, the other side of said magnet being connected by wire 36 to the 110 volt line 38. Magnet 17 is thus energized closing the double pole switch including switch blades 51 which are disposed in wires 13. Solenoid 12 likewise then becomes energized rotating the four-way valve 8, the air pressure reversing the position of the piston in power cylinder 7 which causes the valve blade 3 to be opened. Upon the opening of the relief valve as above described, water rushes into pipe 1 relieving the excess vacuum therein.

Upon relief of the vacuum, the needle 21 of the vacuum gauge 18 will begin to drop back to a normal position and unless some arrangement is provided to prevent the same, the entire circuit will immediately reverse and result in closing the relief valve, and which would undoubtedly cause the undesirable teetering or jockeying of the valve as heretofore described.

To prevent such occurrence, I have included the time delay relay 46 in the circuit and the armature 48 of such relay remains closed with contact point 49 for a predetermined period after the disc 23 no longer obstructs the light to the photoelectric cell 29 and such cell has reenergized relay 41 and broken the contact between armature 42 and contact point 57. However, the breaking of such contact does not permit the circuit to return to normal for the reason that the wire 60 continues to supply current into the circuit through switch blades 52 and 53 and the circuit is not interrupted until the time delay relay functions to break the contact between armature 48 and contact point 49. A holding circuit arrangement is thus provided.

It will thus be obvious that upon an excess vacuum being created in pipe 1, my improved automatic control assembly will function to instantaneously and positively open the relief valve, and thereafter as the vacuum in pipe 1 is relieved and reduced will close the relief valve only after a certain time lag so that the vacuum in pipe 1 will in all cases return to a normal before the assembly functions to return itself to a normal position.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a suction pipe, a normally closed relief valve, a fluid actuated power unit to operate the relief valve and including a separate fluid control valve; and control mechanism comprising electrically actuated means arranged in operative connection with said separate valve, a circuit for and including said means, a normally open switch in said circuit, a photoelectric cell, means normally energizing the cell, a relay actuated from the cell, other electrical means to close said switch when the cell and relay are de-energized, and vacuum responsive means in communication with the suction pipe and operative to de-energize the cell when the vacuum in the pipe exceeds a predetermined amount.

2. A control mechanism as in claim 1 in which said other electrical means includes a time delay relay adapted to prevent opening of the switch and resultant closing of the relief valve for a predetermined time after said switch is closed and the fluid actuated power unit has opened the relief valve.

3. A control assembly for the power unit of a power actuated, underwater, excess vacuum relief valve on the suction pipe of a dredge; said control assembly comprising means to actuate said power unit so as to effect alternate opening and closing movement of the valve, control mechanism to operate said means, said control mechanism being responsive to vacuum in the suction pipe, and time delay mechanism connected with said control mechanism and operative when the relief valve is open and excess vacuum relieved, to then effect a predetermined delay of the operation of the control mechanism and resultant actuation of said means and valve closing operation of the power unit.

4. A control assembly for the power unit of a power actuated, underwater, excess vacuum relief valve on the suction pipe of a dredge; said control assembly comprising means to actuate said power unit so as to effect alternate opening and closing movement of the valve, electrical control mechanism to operate said means and including a circuit, said control mechanism being responsive to vacuum in the suction pipe, and a time delay relay interposed in the circuit and operative when the relief valve is open and excess vacuum relieved, to then effect a predetermined delay of the operation of said control mechanism and resultant actuation of said means and valve closing operation of the power unit.

DAVID L. HOFER.